(12) United States Patent
Sousa et al.

(10) Patent No.: US 8,572,194 B2
(45) Date of Patent: Oct. 29, 2013

(54) SELECTIVE LINKING OF MESSAGE ACCOUNTS

(75) Inventors: Audrey Yung Chin Sousa, Seattle, WA (US); Chad Roberts, Snohomish, WA (US); Shawn Cantin Callegari, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 18 days.

(21) Appl. No.: 13/158,201

(22) Filed: Jun. 10, 2011

(65) Prior Publication Data
US 2012/0317208 A1 Dec. 13, 2012

(51) Int. Cl.
*G06F 15/16* (2006.01)

(52) U.S. Cl.
USPC ........................................ 709/206

(58) Field of Classification Search
USPC .................................. 709/203–206
See application file for complete search history.

(56) References Cited

U.S. PATENT DOCUMENTS

| | | | |
|---|---|---|---|
| 6,965,918 B1 | 11/2005 | Arnold et al. | |
| 7,155,725 B1 | 12/2006 | Kister et al. | |
| 7,484,213 B2 * | 1/2009 | Mathew et al. | 718/100 |
| 2001/0029524 A1 | 10/2001 | Smith et al. | |
| 2004/0068544 A1 | 4/2004 | Malik et al. | |
| 2004/0137884 A1 | 7/2004 | Engstrom et al. | |
| 2006/0009243 A1 * | 1/2006 | Dahan et al. | 455/466 |
| 2007/0100856 A1 | 5/2007 | Ebbesen | |
| 2007/0250581 A1 * | 10/2007 | Patel et al. | 709/206 |
| 2008/0134295 A1 * | 6/2008 | Bailey et al. | 726/4 |
| 2009/0228807 A1 * | 9/2009 | Lemay | 715/752 |
| 2011/0086613 A1 * | 4/2011 | Doudkine et al. | 455/410 |
| 2011/0197163 A1 * | 8/2011 | Jegal et al. | 715/811 |
| 2011/0231499 A1 * | 9/2011 | Stovicek et al. | 709/206 |
| 2011/0252375 A1 * | 10/2011 | Chaudhri | 715/835 |
| 2011/0264689 A1 * | 10/2011 | Hirst et al. | 707/769 |
| 2012/0266098 A1 * | 10/2012 | Webber | 715/778 |
| 2012/0290946 A1 * | 11/2012 | Schrock et al. | 715/752 |
| 2013/0110953 A1 * | 5/2013 | Sutedja et al. | 709/206 |

FOREIGN PATENT DOCUMENTS

| | | |
|---|---|---|
| EP | 2139208 | 10/2010 |
| KR | 20100133258 | 12/2010 |
| WO | WO2007040514 | 4/2007 |

OTHER PUBLICATIONS

How to Link Multiple GMail Accounts Together in 4 Easy Steps, (http://www.makeuseof.com/tag/how-to-link-multiple-gmail-accounts-together-in-4- easy-steps), Oct. 27, 2008.
Halder, "How to Manage Multiple Gmail Accounts and Check Email at One Place," (http://maketecheasier.com/manage-multiple-gmail-accounts-in-one-place/2009/11/27), Nov. 27, 2009.
Concept: Windows Phone 7 Email Hub, (http://wmpoweruser.com/concept-windows-phone-7-email-hub), Mar. 2, 2011.
International Search Report and Written Opinion for related matter PCT/US2012/041784, mailed Feb. 28, 2013.

* cited by examiner

*Primary Examiner* — Joshua Joo
(74) *Attorney, Agent, or Firm* — Klarquist Sparkman, LLP

(57) ABSTRACT

The present application relates to message account linking that allows users to selectively link message accounts and customize those linked message accounts. In one embodiment, the user selects a number of message accounts for selective linking. A message application updates a message account database to selectively link the message accounts and create a combined message box. When a user selects the combined message box for display, all messages from the selectively linked message accounts are displayed. In one embodiment, a user can create multiple combined message boxes on a single device, and may assign names to each of the combined message boxes. In yet another embodiment, an icon associated with a combined message box is added to the device's home screen.

20 Claims, 14 Drawing Sheets

SELECTIVE LINKING OF MESSAGE ACCOUNTS

FIELD

The present application relates to message account linking and, in particular, to selective linking of message accounts and customization of linked message accounts.

BACKGROUND

Devices with multiple message accounts are well known. For example, a user may maintain several email accounts on his or her mobile phone (e.g., Hotmail, Exchange, Gmail, Yahoo! mail). The mobile phone allows the user to view, send, and receive messages from these various message accounts. In many instances, a user may employ the device to access multiple work related email accounts and multiple personal email accounts. Typically, however, each of these accounts must be accessed separately and a user may view only one account at a time.

Some devices automatically provide a message box that allows a user to view messages from all message accounts on the device in one unified message box. An example of this is the iPhone's "All Inboxes" message box. Such global message boxes automatically group all message accounts together. In these circumstances, the user may view only messages from a single account or messages from all accounts at a given time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application is directed to selective linking of message accounts. For example, on a device containing multiple message accounts, a user may individually select a group of the message accounts to be linked. The selected message accounts are then linked to create a combined message box. The combined message box provides a display of messages from each of the selected message accounts.

In one embodiment, two or more combined message boxes can be generated on a single device by selectively linking two or more groups of message accounts. Each of the combined message boxes provides a display of the messages from its corresponding linked message accounts.

In another embodiment, a custom name can be provided for a combined message box. Alternatively, a generic name can be assigned to the combined message box.

In another embodiment, an icon associated with a combined message box is added to a user interface. This icon may be used to generate a display of the combined message box, showing all messages from the selectively linked accounts that form the linked message box.

In another embodiment, the message accounts may be selectively linked and displayed using a message application native to the device. Alternatively, the device's operating system or a third party application may perform the selective linking of the message accounts and display the combined message box. Depending on the method used, an API may be required.

In yet another embodiment, a selectively linked message account may be unlinked from a combined message box without removing the unlinked message account from the device.

The foregoing and other objects, features, and advantages of the invention will become more apparent from the following detailed description, which proceeds with reference to the accompanying figures.

DETAILED DESCRIPTION

Figure 1:
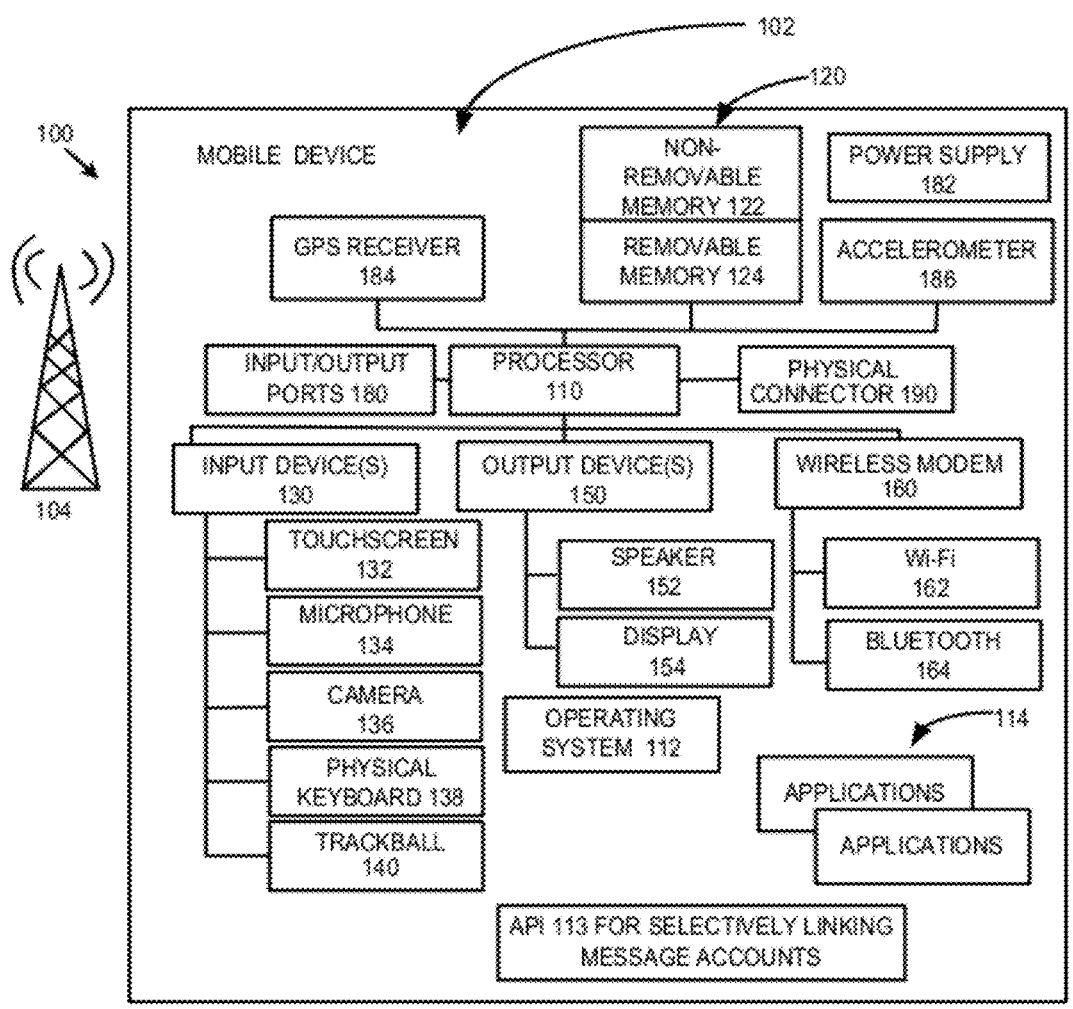
FIG. 1 is an exemplary mobile phone that can be used for selectively linking message accounts.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application. An API 113 can also be used for selectively linking message accounts on the device.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touch screen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
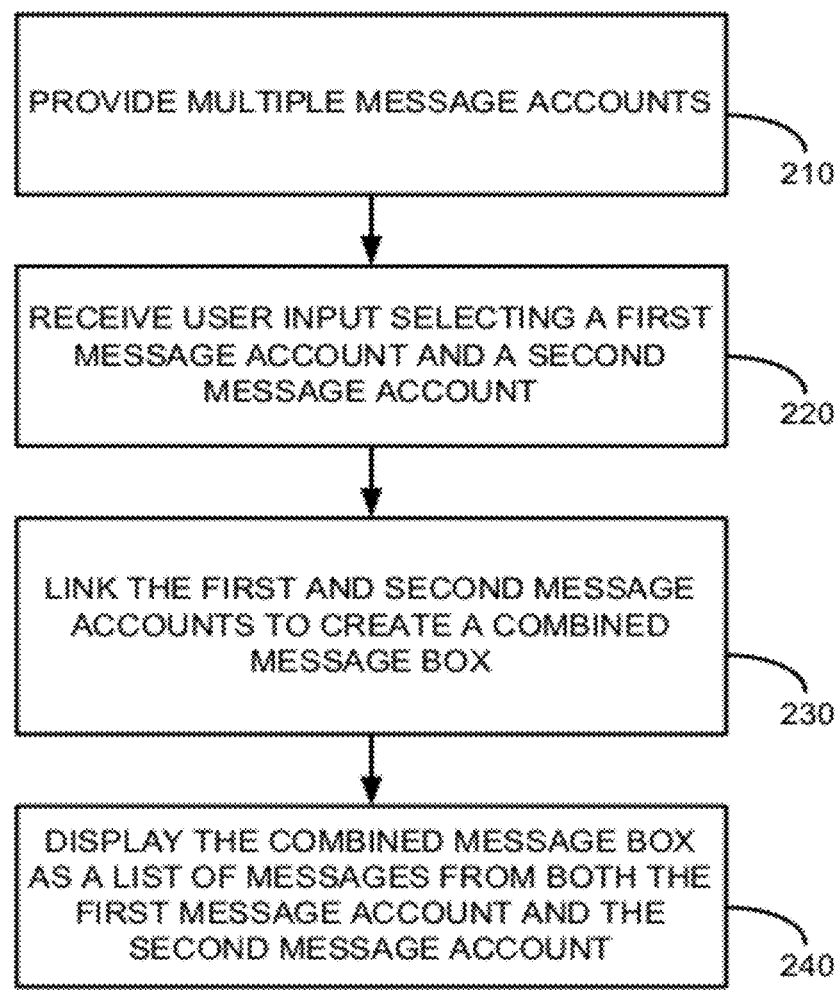
FIG. 2 is a flowchart of an exemplary method for selectively linking message accounts to create a combined message box and display the combined message box as a list of messages from the selectively linked message accounts.

FIG. 2 is a flowchart of an exemplary method for selectively linking message accounts to create a combined message box on a device. In process block 210, multiple message accounts may be provided. The message accounts may be of one or more different types, such as, for example, email accounts; text messaging accounts, such as SMS; social network accounts, such as Facebook messaging, LinkedIn inbox, Flickr messages, or Twitter; and/or instant messaging accounts, such as chat accounts. Each message account may be provided by a different service provider or a service provider may provide multiple or up to all of the message accounts on the device. For example, a mobile phone device may have two email accounts provided by Microsoft, a third email account provided by Google, and a fourth email account and a text message account provided by a mobile phone service provider. In process block 220, user input may be received for selecting first and second message accounts that the user would like to link. For example, the user may select the first and second message accounts from a list of multiple message accounts. In process block 230, the first and second message accounts are linked to create a combined message box. In process block 240, the combined message box is displayed as a list of messages from both the first message account and the second message account.

Figure 3:
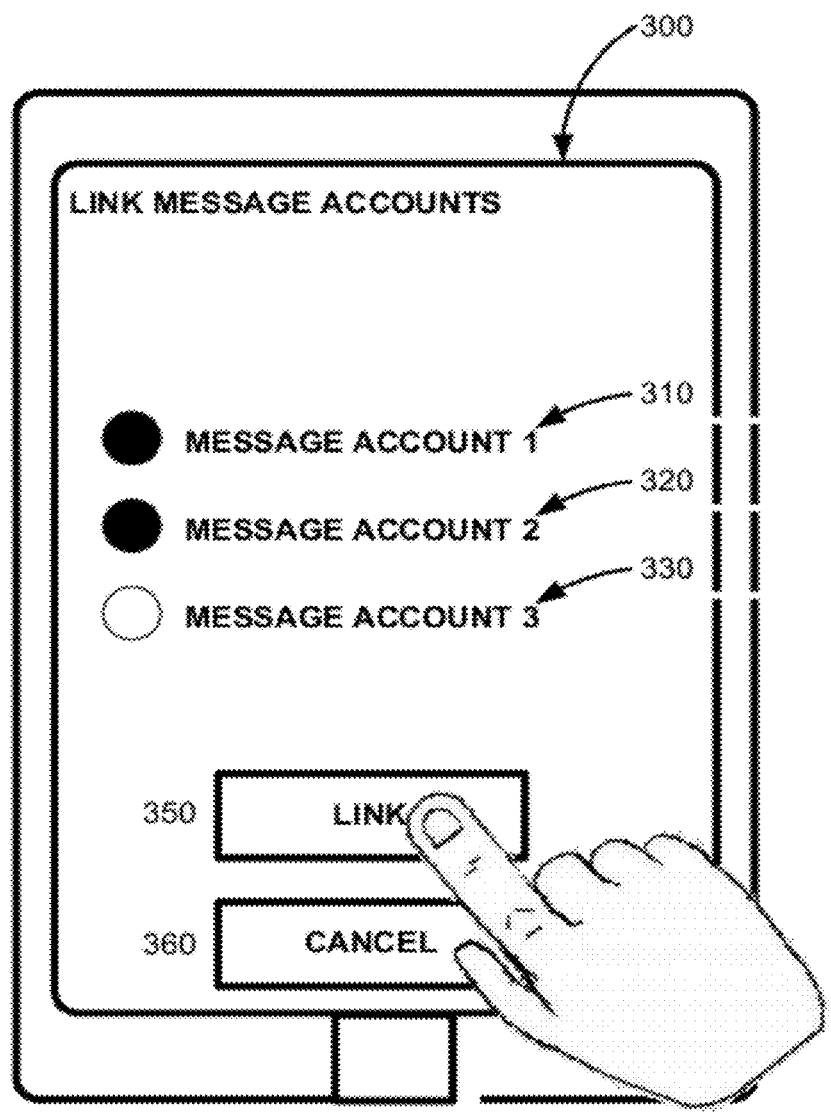
FIG. 3 is an exemplary embodiment showing a user identifying message accounts for selective linking to create a combined message box.

FIG. 3 illustrates an exemplary embodiment of a user device interface that can be used to identify message accounts to be selectively linked. The interface 300 includes a list of message accounts available for linking 310, 320, and 330, a link button 350, and a cancel button 360. The interface 300 allows a user to select message accounts for linking from the list of message accounts 310, 320, and 330, and then to tell the device to link the accounts by selecting the link button 350. If a user changes her mind and decides she does not want to link she may select the cancel button 360.

Figure 4:
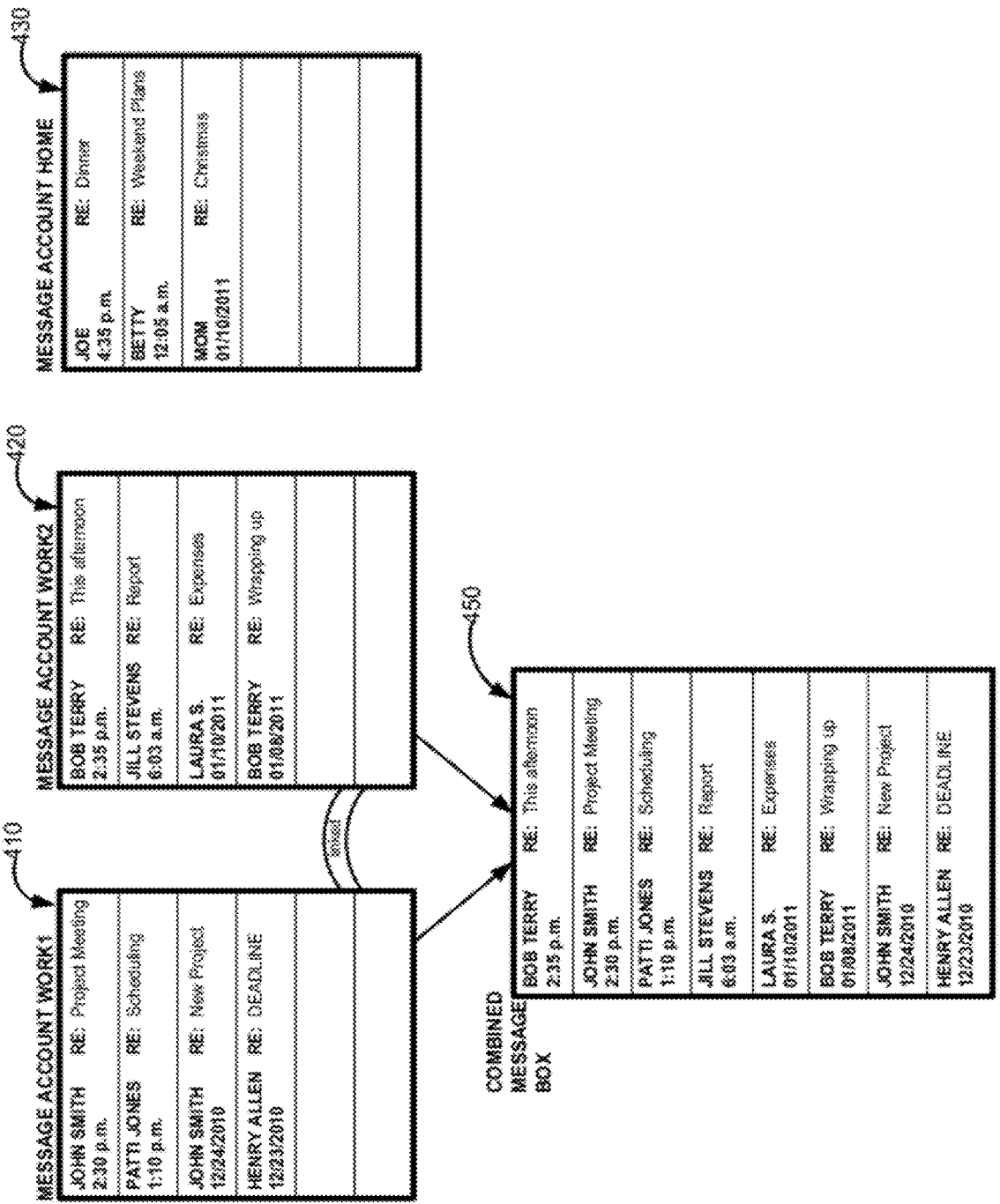
FIG. 4 is an exemplary diagram illustrating how the list of messages in a combined message box may be generated and displayed.

FIG. 4 shows an example of how a combined message box may be generated by combining messages from linked message accounts. In this example, the device may have three message accounts 410, 420, and 430. As shown, in this instance, message account 410 and message account 420 may be linked to one another, while message account 430 may remain unlinked. Combined message box 450, in this instance, contains all messages from both message account 410 and message account 420. The combined messages may be sorted in chronological order, as shown in the example combined message box 450. In one embodiment, in order to generate and display the combined message box 450, the system or an application on the system may access each message in message account 410 and message account 420, determine the chronological sequence of the messages, and then generate the combined message box 450 with the messages in chronological order. As shown, because message account 430 is unlinked, none of its messages appear in the combined message box 450. Messages in message account 430 may still remain accessible by other means on the device. Once generated, combined message box 450 can be displayed on a user interface of the device.

Figure 5:
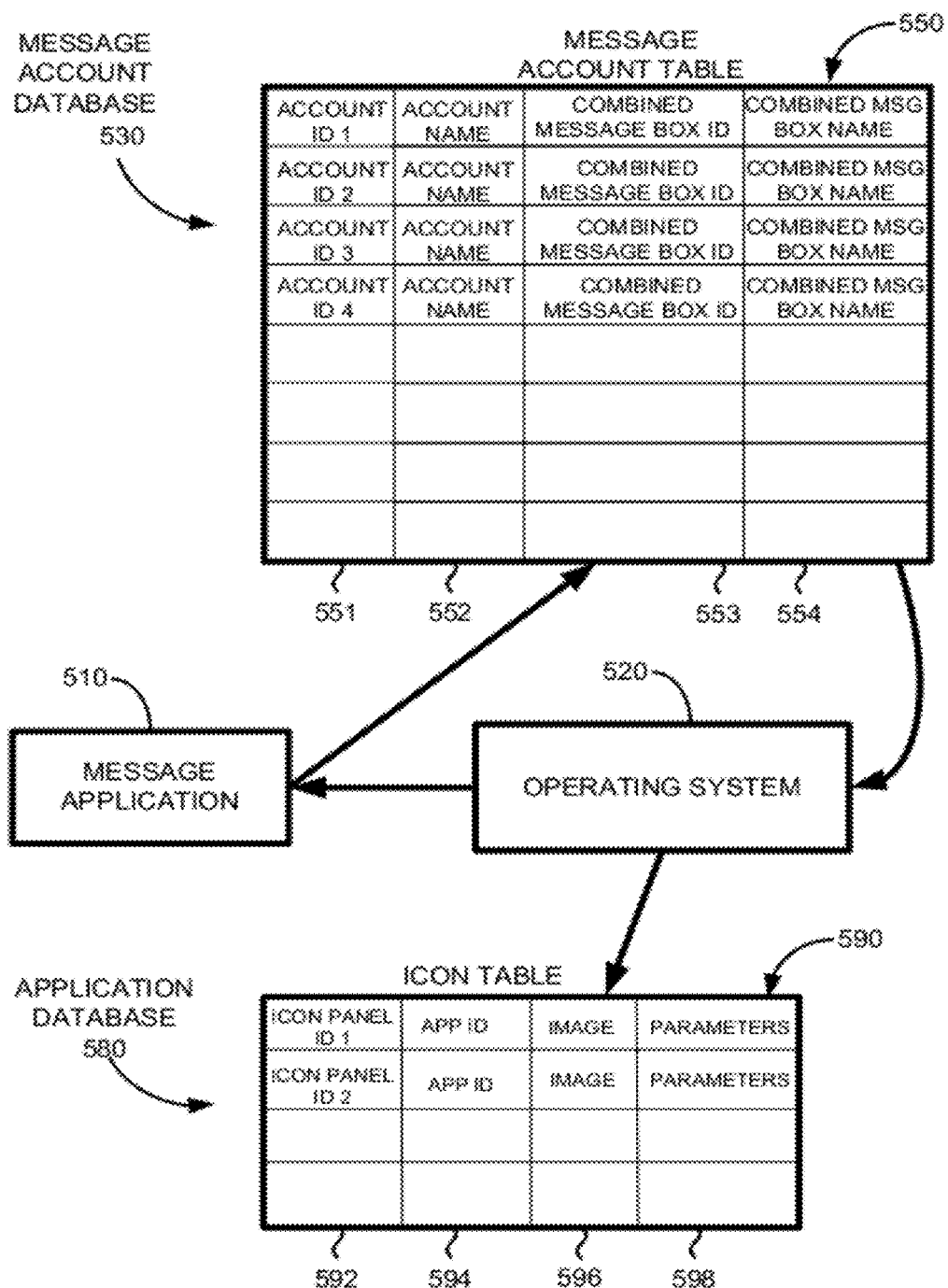
FIG. 5 shows an embodiment of a system diagram with the interaction between a message application, an operating system, a message account database, and an application database.

FIG. 5 shows a diagram of an example system that can be used for selectively linking message accounts. A message application is shown at 510. The message application may selectively link message accounts by updating entries in a message account database 530. The message account database 530 can take a wide variety of forms. The message account database 530 illustrated in FIG. 5 includes only one table, a message account table 550, but the message account database 530 can include as many tables as needed. Message account table 550 may include entries for each message account on the device. The table 550 includes multiple fields, such as a message account ID field 551, a message account name field 552, a combined message box ID field 553, and a combined message box name field 554. The message account ID field 551 identifies each message account on the device by a specific message account ID. The message account ID may be, for example, a global unique ID (GUID) or a universal unique ID (UUID). The combined message box ID field 553 indicates which, if any, combined message boxes the message account is associated with. The combined message box ID may be, for example, a global unique ID (GUID) or a universal unique ID (UUID). As one example, the message application 510 may access the message account database 530 and retrieve the entry in the combined message box ID field 553 of a message account having a particular entry in the message account ID field 551. Alternatively, the message application 510 may selectively link two message accounts by updating the message account table 550 so that the combined message box ID entries 553 for the two message accounts are the same. The combined message box name field 554 may contain an entry indicating the name of the combined message box. In some instances, the entry for the combined message box name field 554 is automatically generated as a generic name. In other instances, the entry for the combined message box name field 554 is received from a user interface.

The operating system 570 may use values in the message account database 530 to update the application database 560, which may include an icon table 590. As is well known in the art, icons may generally be used to initiate actions on a device, such as launching an application. In one embodiment of the present invention, when message accounts are selectively linked to create a combined message box, the operating system 570 may update an icon table 590 in an application database 580 so that an icon associated with the new combined message box is added to a device home screen. In another example, the operating system 570 may update the icon table 590 in an application database 580 so that an icon associated with a particular message account is removed from a device home screen. The exemplary icon table shown at 580 includes multiple fields including an icon panel ID field 592, an application ID field 594, an image field 596, and a parameters field 598. In one embodiment, the operating system may generate a new icon panel with such that the parameters field 598 contains a combined message box ID and the app ID field 594 corresponds to a message application. When the associated icon is selected by a user, the combined message box ID can be passed as a parameter to the message application, causing the message application to launch with the combined message box as an entry page.

Figure 6:
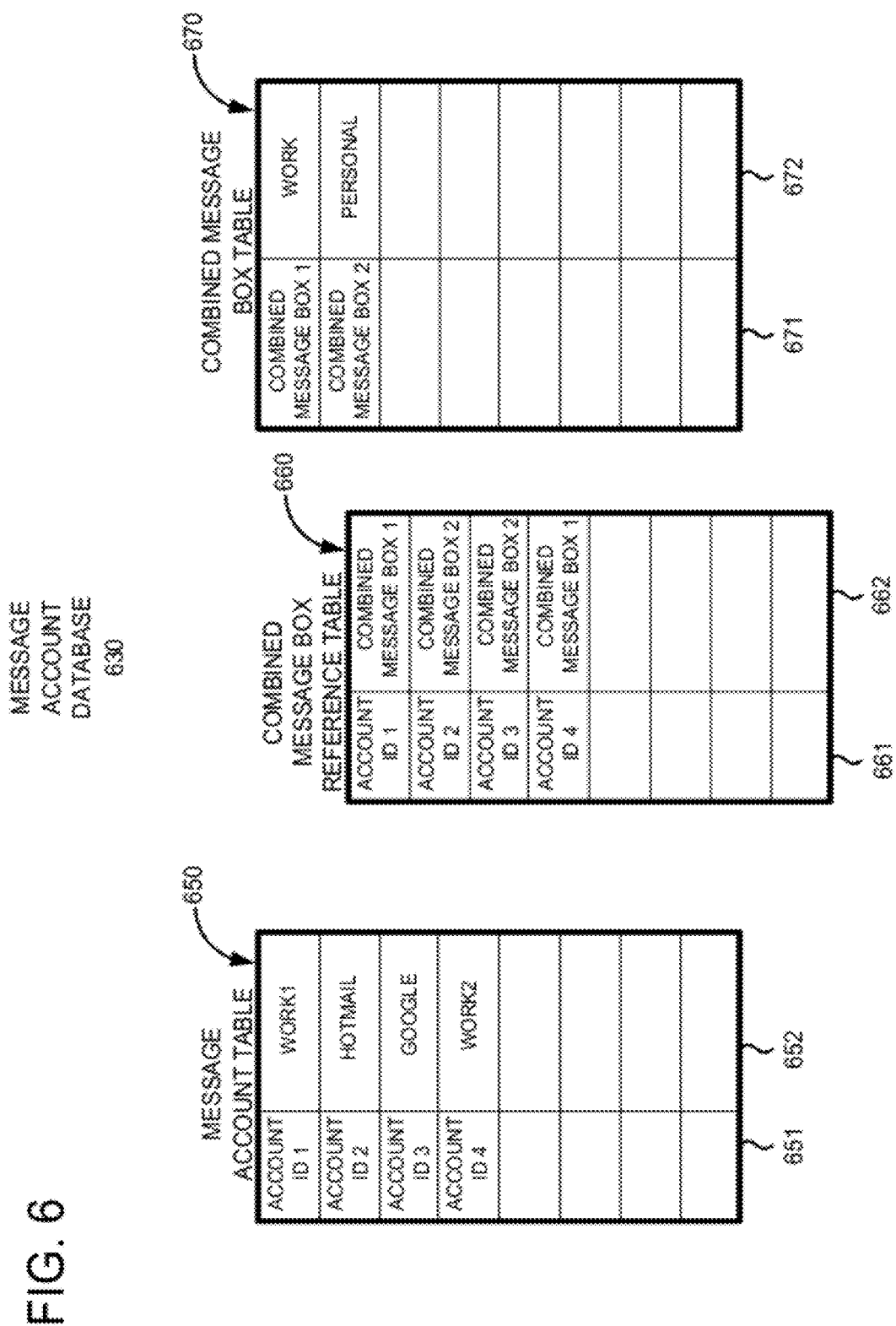
FIG. 6 shows another exemplary embodiment of a message account database.

FIG. 6 illustrates an alternative exemplary embodiment of a message account database 630. The message account database 630 includes a message account table 650, a combined message box reference table 660, and a combined message box table 670. The message account table 650 includes multiple fields including a message account ID field 651 and an account name field 652. The combined message box reference table 660 includes multiple fields including a message account ID field 661 and a combined message box ID field 662. The combined message box table 670 includes multiple fields including a combined message box ID field 671 and a combined message box name field 672. In one embodiment, the fields in the tables 650, 660, 670 in the message account database 630 may be modified by a message application or an operating system in order to selectively link message accounts or to rename a combined message box. In another embodiment, the message application may use an API to update the fields or the operating system may directly update the fields.

Figure 7:
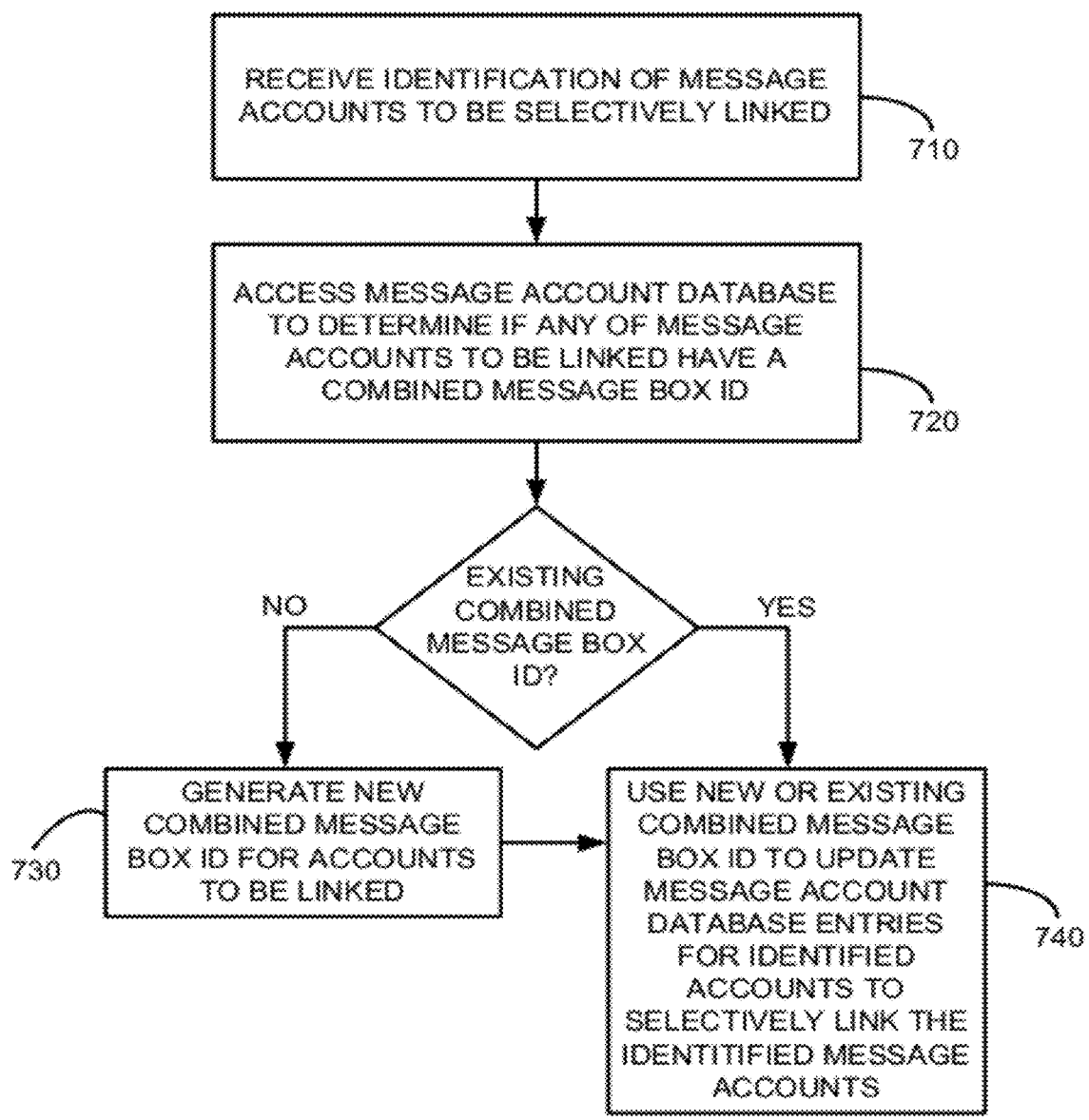
FIG. 7 is a flowchart showing in more detail an exemplary method for linking message accounts.

FIG. 7 shows a flowchart of an exemplary method providing further details of how to implement selective linking of message accounts to create a combined message box. In process block 710, an identification of message accounts to be selectively linked may be received. In one embodiment, if multiple message accounts are provided on a device, an identification of a subset of the multiple message accounts to be selectively linked may be received. For example, if four message accounts are provided on a device, a subset of two message accounts may be identified to be selectively linked. In process block 720, a message account database may be accessed to determine if any of the identified message accounts have a combined message box ID. Typically, if a message account is already linked with at least one other message account, that message account's entry in the message account database may contain a valid combined message box ID. If none of the accounts have a valid combined message box ID, then the method may proceed with process block 730, wherein a new combined message box ID may be generated in order for the accounts to be linked. The combined message box ID can be generated in any way known in the art for generating IDs. In one embodiment, the combined message box ID can be generated as a globally unique ID (GUID) or a universally unique ID (UUID). In process block 740, either a new or previously existing message box ID may be used to update the message account database to selectively link the identified accounts. The result may either be creation of a new combined message box or updating of an existing combined message box, depending on whether any of the identified message accounts were already selectively linked.

Figure 8:
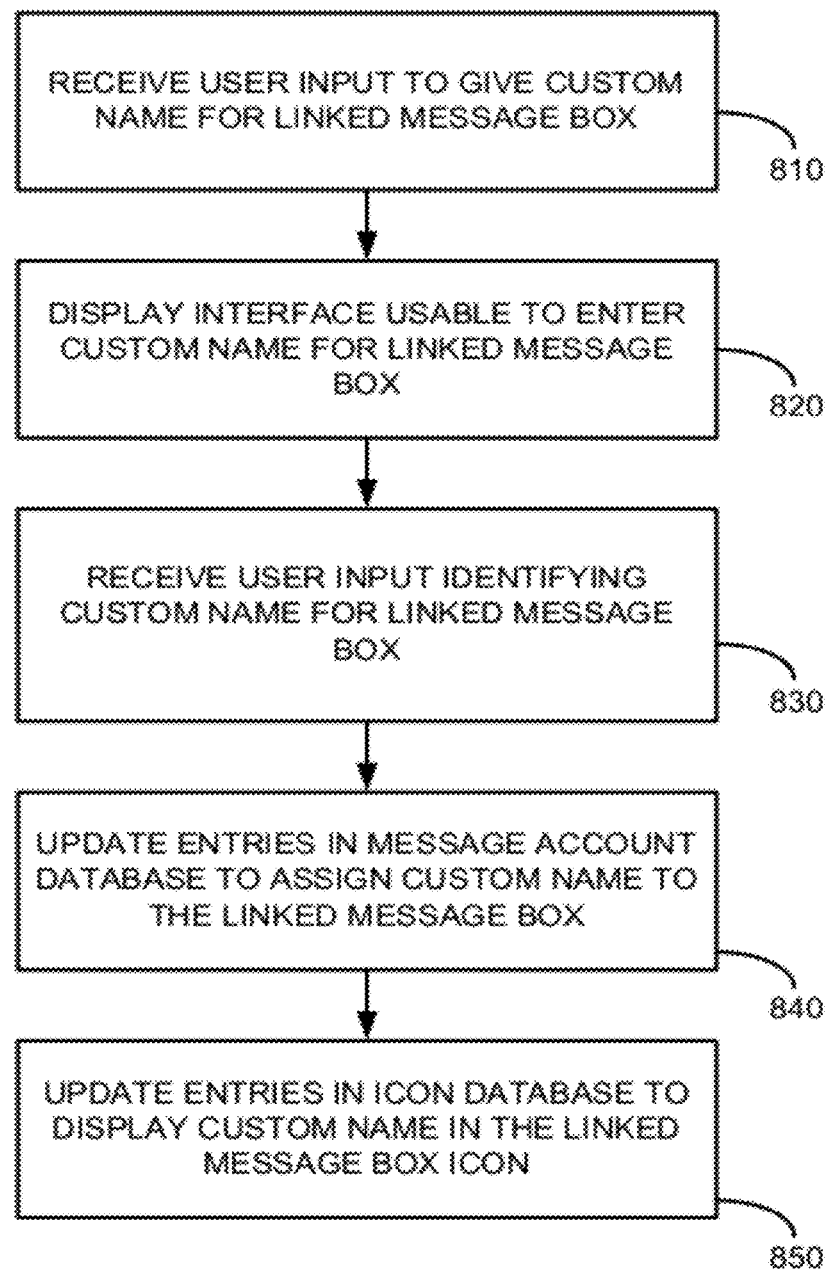
FIG. 8 is a flowchart of an exemplary method for providing a custom name for a selectively combined message box.

FIG. 8 shows a flowchart of an exemplary method providing further details on how a linked message account can be given a custom name. While a name may in some instances be automatically generated for a combined message box, in other instances a user may wish to provide a custom name for the combined message box. In process block 810, user input can be received indicating that the user would like to give a combined message box a custom name. In process block 820, an interface can be provided to the user for receiving from the user a custom name for the combined message box. In process block 830, the user identifies the custom name for the combined message box. In process block 840, entries in a message account database are updated to assign the user-identified name to the combined message box. In process block 850, entries in an icon database are updated to display the custom name of the combined message box on the icon. As just one example, the icon database may include an image field and the database entry for the icon associated with the combined message box would be updated so that its image field includes a custom name of a combined message box.

Figure 9:
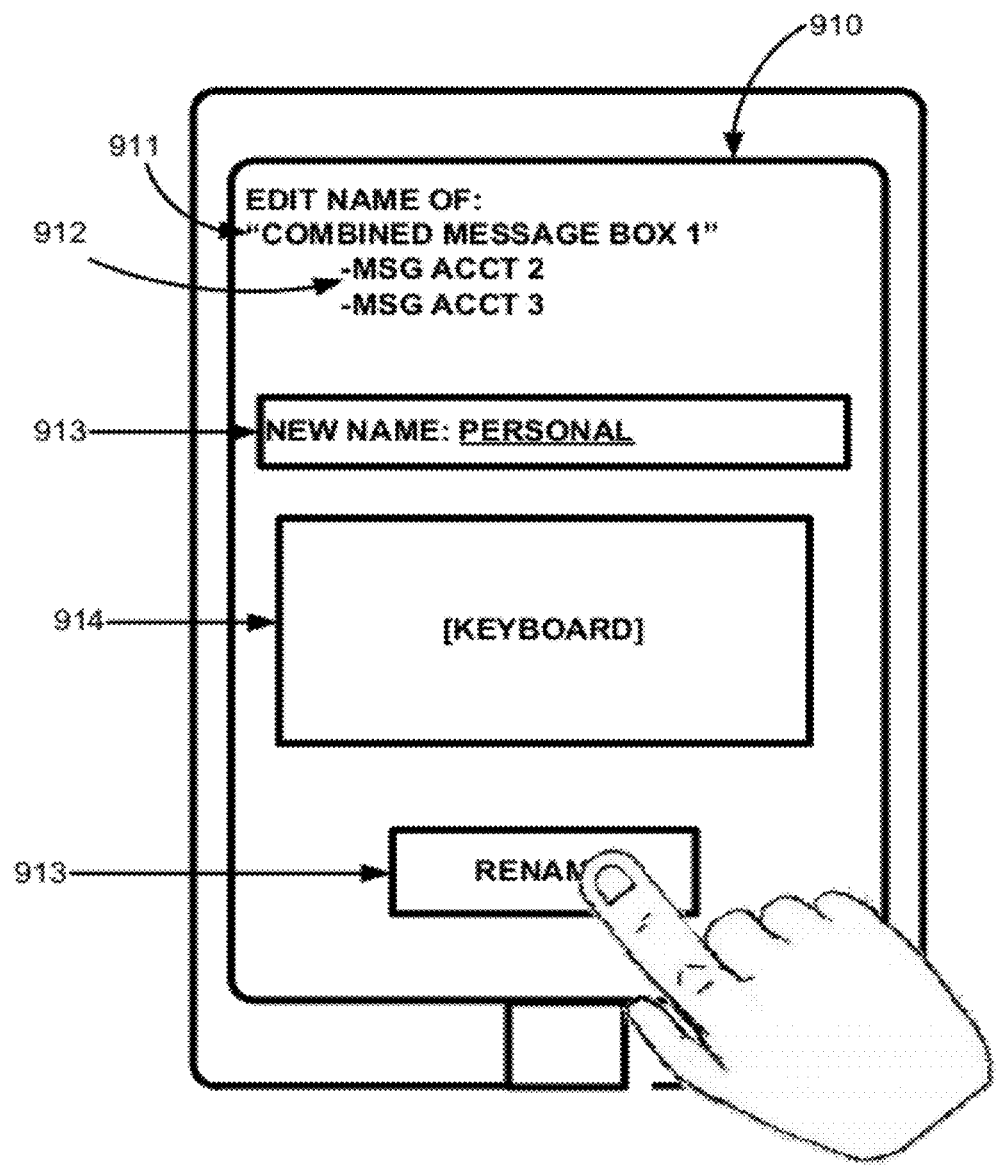
FIG. 9 is an exemplary embodiment showing a user providing a custom name for a combined message box.

FIG. 9 illustrates an exemplary embodiment of a user device interface that can be used to provide a new name for a combined message box. The interface 910 identifies the current name of the combined message box 911, the selectively linked message accounts associated with the combined message box 912, a name entry box 913 for specifying the new name of the combined message box, a keyboard 914 or other user input device for specifying the new name, and a button 915 that when selected by the user may save the new name and may cause the message account and icon databases to be updated with the new name for the combined message box.

Figure 10:
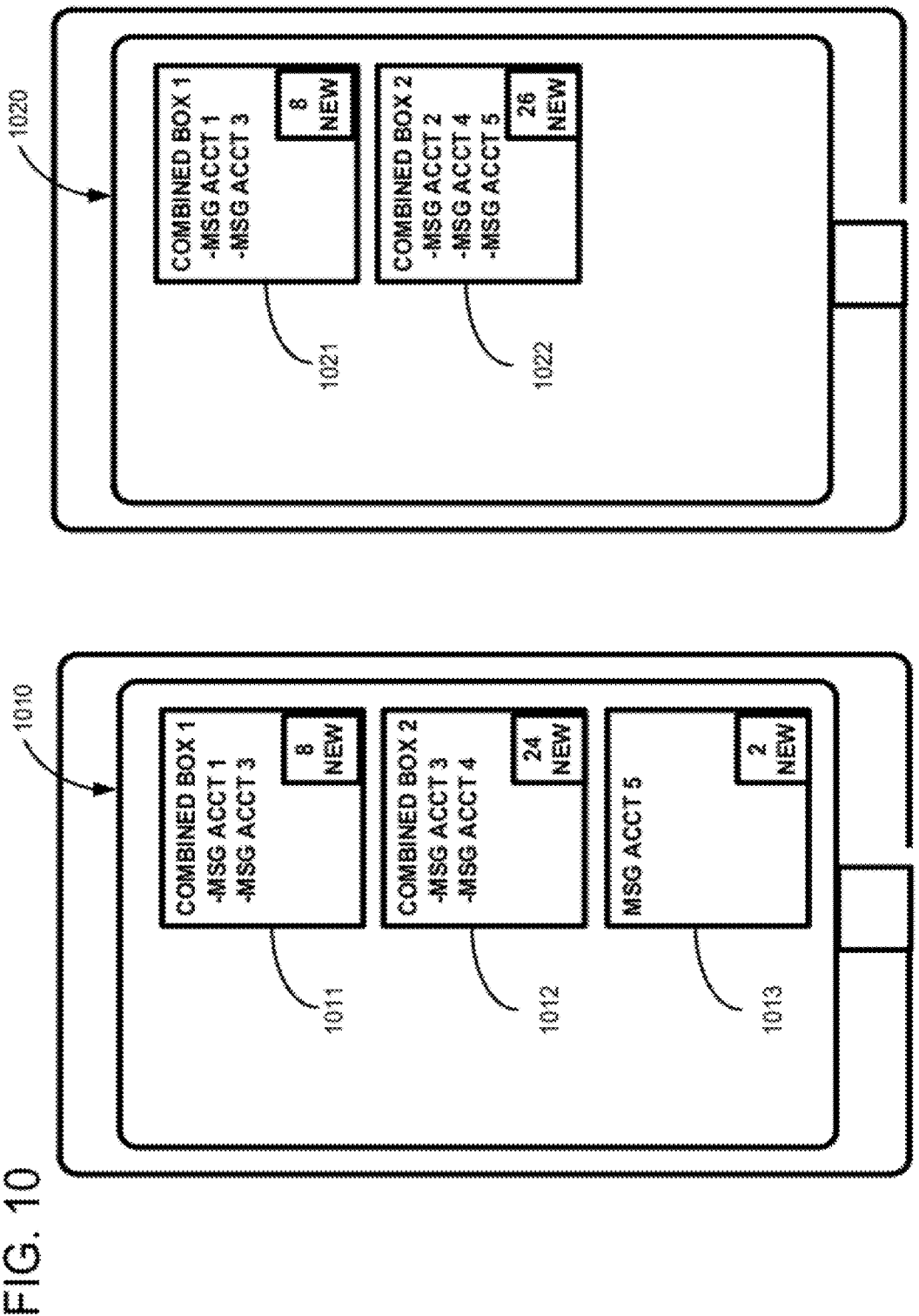
FIG. 10 illustrates how icons appearing on a user device can be updated as part of selective linking of message accounts.

FIG. 10 illustrates an exemplary embodiment of a user device's home screen display and the manner in which that home screen display may change in response to selective linking of message accounts. The home screen as shown at 1010 includes three icons: an icon for a first combined message box 1011, an icon for a second combined message box 1012, and an icon for an unlinked message account 1013. The icons for the first and second combined message boxes 1011/1012 indicate the names of the combined message boxes (COMBINED BOX 1 and COMBINED BOX 2), as well as the selectively linked message accounts associated with each respective combined message box and the number of new messages in each of the respective combined message box. The icon for the unlinked message account 1013 simply indicates the name of the message account, MSG ACCT 5, and the number of new messages in that account. As taught herein, a user may selectively link the message account associated with icon 1013 (MSG ACCT 5) with the combined message box associated with icon 1012 (COMBINED BOX 2). After selective linking, the home screen shown at 1010 may be updated to appear as the home screen shown at 1020. As can be seen, the updated home screen 1020 may have an icon for a first combined message box 1021 identical to icon 1011 in home screen 1010. In the home screen at 1020, however, the icon for the second combined message box 1021 may be updated to reflect the newly-linked MSG ACCT 5 as well as the number of new messages from MSG ACCT 5 that are now a part of the second combined message box. In addition, in the home screen at 1020 the icon for the previously-unlinked message account, MSG ACCT 5, has been removed because that message account is now linked with other message accounts.

Figure 11:
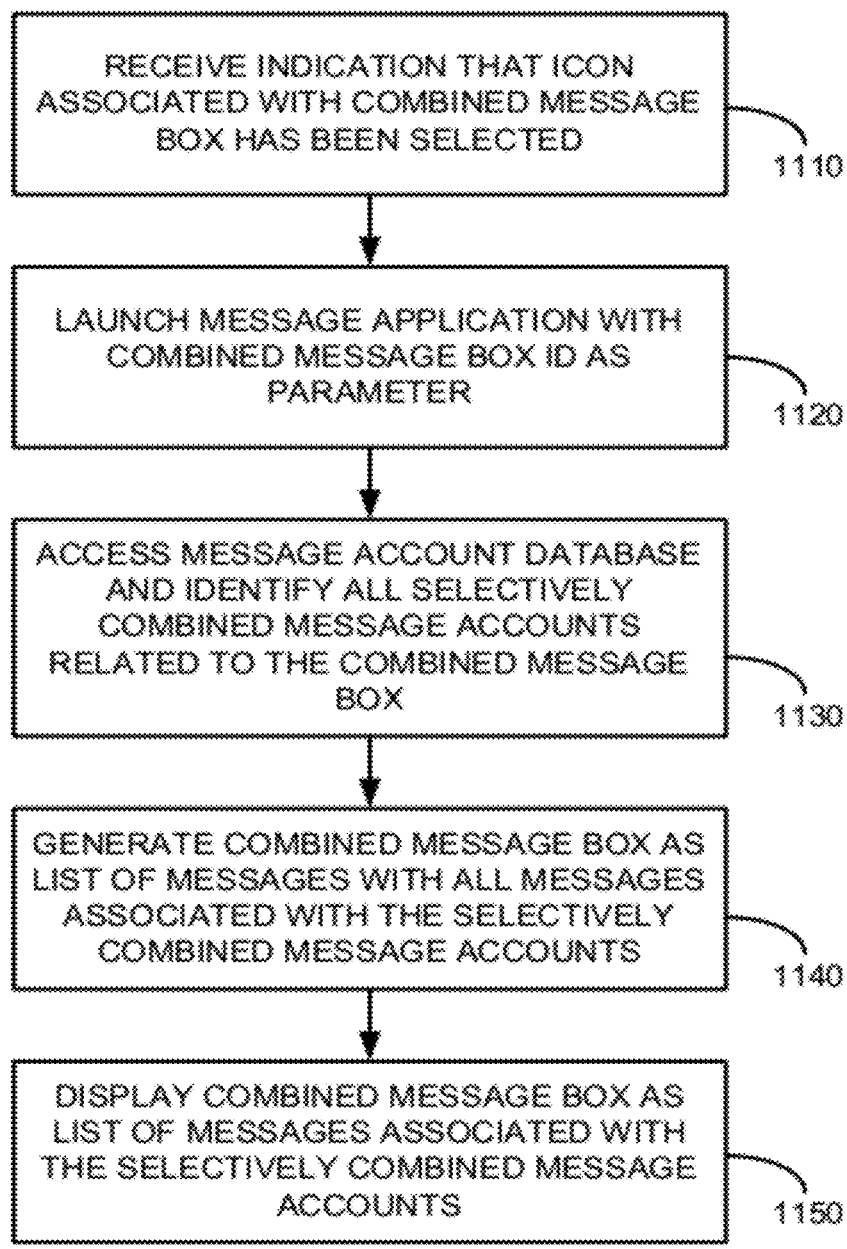
FIG. 11 is a flowchart of an exemplary method for launching an application for viewing the messages in a combined message box.

FIG. 11 shows a flowchart of an example method of how a combined message box may be displayed by launching a message application. In process block 1110, an input or indication can be received that a user selected an icon associated with a combined message box. For example, an indication, input, or other signal may be received that a user tapped, clicked on, or otherwise selected an icon associated with a combined message box. In process block 1120, a message application can be launched with the combined message box ID as a parameter. In process block 1130, the message application accesses the message account database and identifies all selectively linked message accounts associated with the combined message box ID. To access the message account database, the message application may have to use an API. In process block 1140, the message application populates a list of messages with all messages from the selectively linked message accounts identified in process block 1130. In one embodiment, process block 1140 involves stepping through each message in the inbox of each message account identified in process block 1130 and populating the list of messages in chronological order. In process block 1150, the message application uses the populated message list of process block 1140 to display all messages associated with the selectively linked message accounts.

Figure 12:
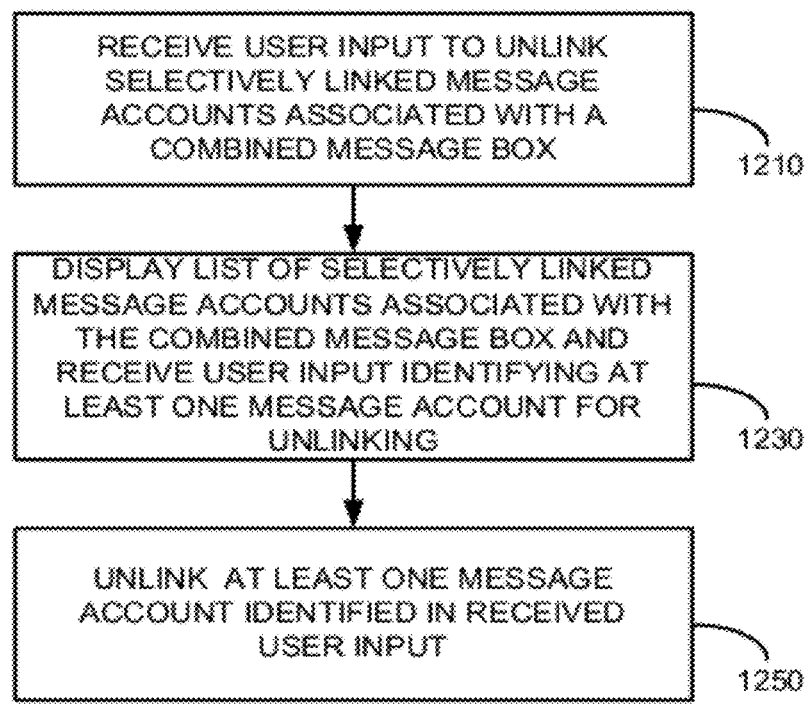
FIG. 12 is a flowchart of an exemplary method for unlinking selectively linked message accounts.

FIG. 12 shows a flowchart of a method for unlinking selectively linked message accounts. In process block 1210, an input can be received that a user desires to unlink selectively linked message accounts associated with a combined message box. In process block 1230, the message application displays a list of selectively linked message accounts associated with the combined message box and receives user input identifying at least one message account for unlinking. In process block 1250, the message application unlinks the at least one message account identified by the user in process block 1230.

Figure 13:
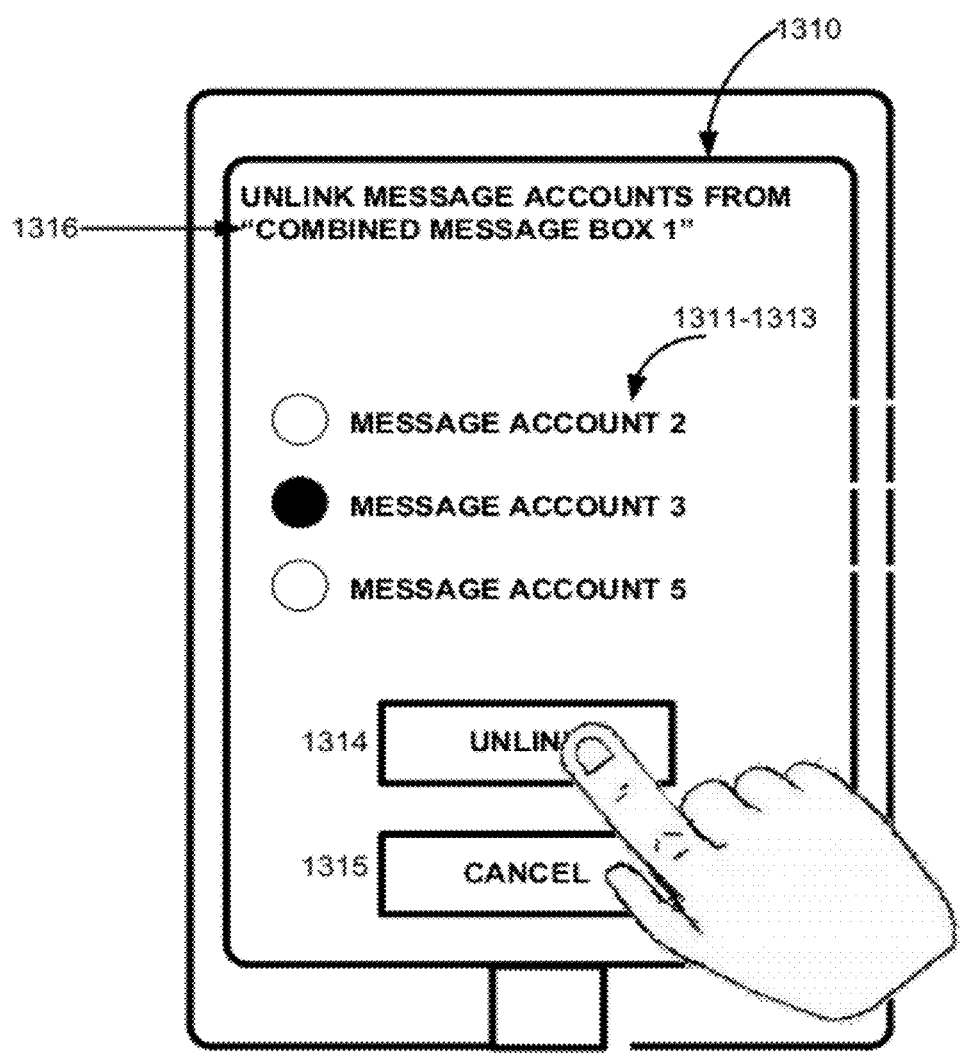
FIG. 13 is an exemplary user interface for unlinking selectively linked message accounts.

FIG. 13 illustrates an exemplary embodiment of a user device interface that can be used to unlink selectively linked message accounts. The interface 1310 identifies the name of the combined message box 1316 and provides a list of the message accounts associated with that combined message box 1311-1313. At the bottom of the interface 1310, there can be an unlink button 1314 and a cancel button 1315. The interface 1310 allows a user to identify message accounts 1311-1313 that can be unlinked from the combined message box identified at 1316. The user instructs the message application to unlink the accounts by selecting the unlink button 1314. If a user changes her mind and decides she does not want to unlink any message accounts she may select the cancel button 1315.

Figure 14:
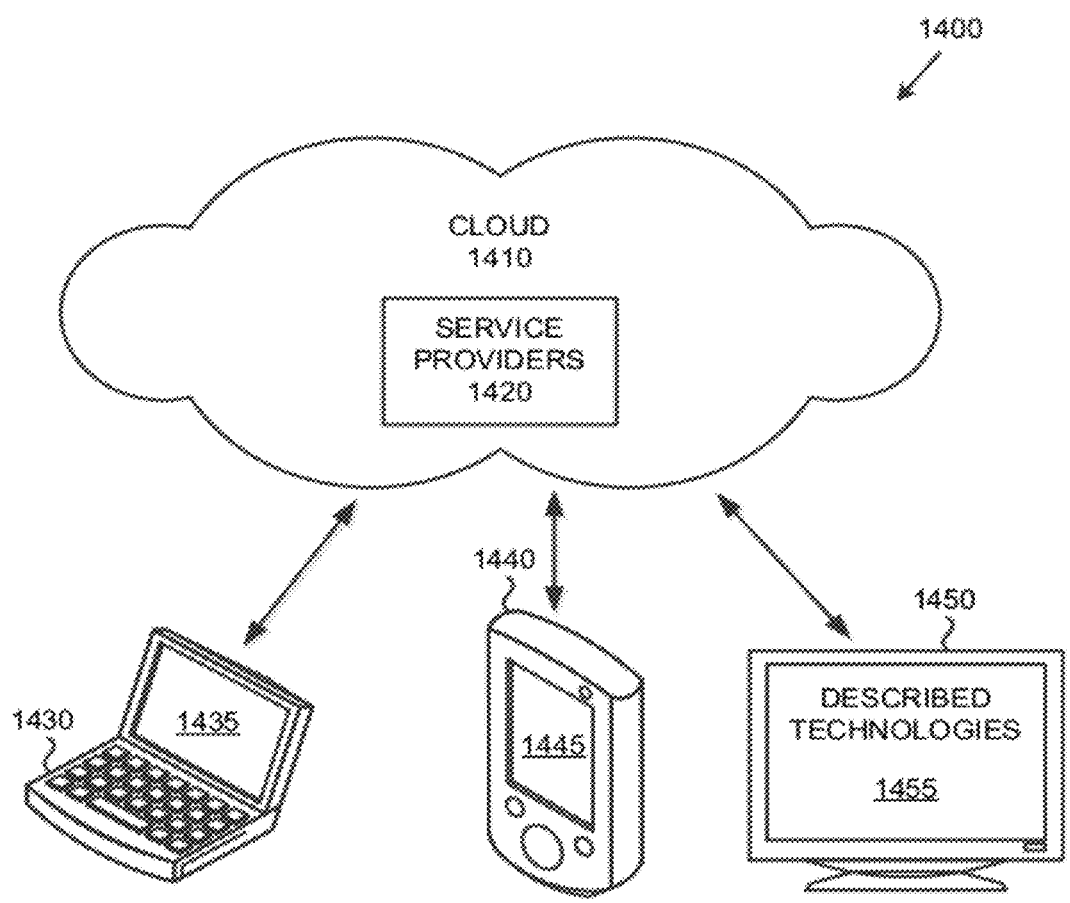
FIG. 14 is an exemplary network that can be used in conjunction with launching applications.

FIG. 14 illustrates a generalized example of a suitable implementation environment 1400 in which described embodiments, techniques, and technologies may be implemented.

In example environment 1400, various types of services (e.g., computing services) are provided by a cloud 1410. For example, the cloud 1410 can comprise a collection of computing devices 1430, 1440, 1450, which may be located centrally or distributed, that provide cloud-based services to various types of users and devices connected via a network such as the Internet. The implementation environment 1400 can be used in different ways to accomplish computing tasks. For example, some tasks (e.g., processing user input and presenting a user interface) can be performed on local computing devices (e.g., connected devices 1430, 1440, 1450) while other tasks (e.g., storage of data to be used in subsequent processing) can be performed in the cloud 1410. In one example, the cloud 1410 can store the message account database, including those tables that contain information related to selectively linked message accounts. In this way, selective linking of message accounts on one device can be applied across all devices.

In example environment 1400, the cloud 1410 provides services for connected devices 1430, 1440, 1450 with a variety of screen capabilities. Connected device 1430 represents a device with a computer screen 1435 (e.g., a mid-size screen). For example, connected device 1430 could be a personal computer such as a desktop computer, laptop, notebook, netbook, or the like. Connected device 1440 represents a device with a mobile device screen 1445 (e.g., a small size screen). For example, connected device 1440 could be a mobile phone, smart phone, personal digital assistant, tablet computer, or the like. Connected device 1450 represents a device with a large screen 1455. For example, connected device 1450 could be a television screen (e.g., a smart television) or another device connected to a television (e.g., a set-top box or gaming console) or the like. One or more of the connected devices 1430, 1440, 1450 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touch screen capability of a particular connected device (e.g., connected devices 1430, 1440, 1450).

In example environment 1400, the cloud 1410 provides the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Similarly, the methods and systems disclosed herein are not limited to any particular type of messaging application and may include message applications provided with a device, message applications provided by third parties, or both. Additionally, if a messaging service is integrated within an operating system, then the operating system may perform the steps and procedures disclosed herein as performed by applications. In some situations, an Application Programming Interface (API) or a Messaging Application Programming Interface (MAPI) may be used when carrying out the methods or implementing the systems disclosed herein. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

We claim:

1. A method of accessing message accounts on a user device, comprising:
    providing multiple message accounts on the user device, wherein the multiple message accounts includes at least a first message account, a second message account, a third message account, and a fourth message account;
    receiving user input selecting the first message account and the second message account;
    linking the first message account and the second message account to create a first combined message box;
    receiving user input selecting the third message account and the fourth message account;
    linking the third message account and the fourth message account to create a second combined message box;
    displaying the first combined message box as a list of messages from both the first message account and the second message account; and
    displaying the second combined message box as a list of messages from both the third message account and the fourth message account.

2. The method of claim 1, wherein the first, second, third, and fourth message accounts are one of the following: an email account, a text message account, a social network messaging inbox, or an instant message account.

3. The method of claim 1, further including providing an interface usable to select at least one of the first, second, third, or fourth message accounts from a list of message accounts for linking to at least one of the first or second combined message boxes.

4. The method of claim 1, wherein the first message account is associated with a first service provider and the second message account is associated with a second service provider.

5. The method of claim 1, further including assigning a name to at least one of the first or second combined message boxes.

6. The method of claim 1, further including providing a user interface usable to name at least one of the first or second combined message boxes.

7. The method of claim 1, further including adding to a user interface an icon associated with at least one of the first or second combined message boxes, and wherein the icon includes a display of one or more of the following: a name of the combined message box associated with the icon, a name of one of the message accounts linked to create the combined message box associated with the icon, or a number representing the sum of the number of messages in the message accounts linked to create the combined message box associated with the icon.

8. The method of claim 1, wherein the multiple message accounts includes at least one message account that is not linked to the first or second combined message boxes.

9. The method of claim 1, further including unlinking one of the first, second, third, or fourth message accounts based on receiving user input to unlink the corresponding message account.

10. One or more computer-readable memory having instructions thereon for executing the method of claim 1.

11. A mobile device capable of selectively linking message accounts, the mobile device comprising:
a processor; and
one or more computer-readable storage media storing instructions that, when executed by the processor, perform a method of selectively linking message accounts, the method comprising:
providing multiple message accounts on the device; and
linking a first subset of the multiple message accounts to create a first combined message box based on received user input identifying the first subset of the multiple message accounts, wherein the first combined message box includes messages from each of the message accounts in the first subset of the multiple message accounts; and
linking a second subset of the multiple message accounts to create a second combined message box based on received user input identifying the second subset of the multiple message accounts, wherein the second combined message box includes messages from each of the message accounts in the second subset of the multiple message accounts.

12. The device of claim 11, wherein the received user inputs include individual user selection of each message account in the first and second subsets of the multiple message accounts.

13. The device of claim 11, wherein at least one of the first or second subsets of the multiple message accounts includes at least three message accounts but less than all of the multiple message accounts.

14. The method device of claim 11, further including automatically adding to a home screen of the device an icon associated with one of the first or second combined message boxes and automatically removing from the home screen an icon associated with one of the message accounts linked to the combined message box for which the icon was added to the home screen.

15. The device of claim 14, further including: receiving an indication that the icon associated with the one of the first or second combined message boxes was selected; and displaying the combined message box associated with the icon as a list of messages from the message accounts linked to create the combined message box associated with the icon.

16. One or more computer-readable memory storing instructions that, when executed by a mobile device, perform a method of providing combined message boxes on the mobile device, the method comprising:
displaying a list of message accounts;
receiving user input selecting a first message account to be linked;
receiving user input selecting a second message account to be linked;
linking the first message account and the second message account to create a first combined message box;
receiving user input selecting a third message account to be linked;
receiving user input selecting a fourth message account to be linked;
linking the third message account and the fourth message account to create a second combined message box;
assigning a name to at least one of the first combined message box or the second combined message box;
displaying the first combined message box as a list of messages from both the first message account and the second message account; and
displaying the second combined message box as a list of messages from both the third message account and the fourth message account.

17. The method of claim 16, wherein the first message account is an email account and the second message account is an email account.

18. The method of claim 16, further including adding an icon associated with the first combined message box and an icon associated with the second combined message box to a user interface of the mobile device.

19. The method of claim 1, wherein the first, second, third, and fourth message accounts are email accounts.

20. The method of claim 11, wherein all of the message accounts in at least one of the first or second subsets of the multiple message accounts are email accounts.

* * * * *